United States Patent [19]

Cosenza et al.

[11] Patent Number: 5,673,052
[45] Date of Patent: Sep. 30, 1997

[54] NEAR-FIELD FOCUSED ANTENNA

[75] Inventors: John M. Cosenza, St. James; Michael Kane, Ridge, both of N.Y.

[73] Assignee: Dorne & Margolin, Inc., Bohemia, N.Y.

[21] Appl. No.: 571,811

[22] Filed: Dec. 13, 1995

[51] Int. Cl.$^6$ ................................................. H01Q 1/38
[52] U.S. Cl. .................................... 343/700 MS; 343/853
[58] Field of Search ........................... 343/700 MS, 795, 343/813, 853, 814, 840

[56] References Cited

U.S. PATENT DOCUMENTS

| | | |
|---|---|---|
| 3,999,182 | 12/1976 | Moeller et al. . |
| 4,074,270 | 2/1978 | Kaloi ................... 343/700 MS |
| 4,114,163 | 9/1978 | Borowick ............... 343/795 X |
| 4,450,449 | 5/1984 | Jewitt . |
| 4,575,728 | 3/1986 | Theobald et al. .......... 343/813 |
| 4,758,843 | 7/1988 | Agrawal ............... 343/795 X |
| 5,001,493 | 3/1991 | Patin et al. . |
| 5,039,994 | 8/1991 | Wash et al. ................ 343/813 |
| 5,157,393 | 10/1992 | Fox et al. . |
| 5,243,358 | 9/1993 | Sanford et al. ........ 343/700 MS X |
| 5,281,974 | 1/1994 | Kuramoto et al. ......... 343/853 X |
| 5,287,117 | 2/1994 | Posluszny . |
| 5,404,145 | 4/1995 | Sa et al. . |
| 5,418,541 | 5/1995 | Schroeder et al. . |

*Primary Examiner*—Donald T. Hajec
*Assistant Examiner*—Tho Phan
*Attorney, Agent, or Firm*—Anthony R. Barkume, P.C.

[57] ABSTRACT

A communication system for transferring data through the air over a relatively short fixed distance comprises a transmitting antenna comprising a leaky coaxial cable for radiating electromagnetic energy modulated with data to be transferred; and a non-linear fixed beam array antenna for receiving the modulated electromagnetic energy from the leaky coaxial cable. The fixed beam array antenna is juxtaposed with the transmitting antenna such that said transmitting antenna extends at least partially through the near-field region of the fixed beam array antenna. The fixed beam array antenna comprises four conductive patch elements comprising two inner patch elements and two outer patch elements juxtaposed linearly on a substantially flat substrate, wherein each of the patch elements is arranged to transduce electromagnetic energy with corresponding electric signals. The antenna also comprises means for shifting the phase of the signals obtained from each of the two inner patch elements by an amount substantially equivalent to the difference between the time the electromagnetic beam is incident upon each inner element and the time the electromagnetic beam is incident upon each outer element; and signal adding means for coherently adding the phase-shifted signals from each inner element and the non-phase-shifted signals from each outer element.

20 Claims, 3 Drawing Sheets

NEAR-FIELD FOCUSED ANTENNA

BACKGROUND OF THE INVENTION

The present invention relates antenna systems, and in particular to the use of a non-linear phase shift in such antennas to obtain focus at a predetermined point in the near field of the antenna.

The focused transfer of electromagnetic energy over a relatively short distance in free space is desired in systems where mechanical connectivity between data transfer points is not feasible due to physical constraints of the system. For example, in the locomotive environment, it is desired to transmit data from a video camera mounted at a station platform to a receiving unit located on a locomotive car, which may be moving in relation to the platform or which may be stationary. In particular, in this system, a transmitting antenna in the form of a leaky coaxial cable is disposed linearly along the train track, and the video data to be transmitted to the receiving unit on the stationary or moving car is modulated on an electromagnetic wave carrier operating in the microwave frequency region. It is therefore required to have a receiving antenna located relatively near but not in contact with the leaky coaxial cable, which receiving antenna may be in motion relative to the leaky coaxial cable while the system transmits data across the link established thereby.

Again, due to the physical constraints of the system, the electromagnetic signal emanating from the leaky coaxial cable is of relatively low power, typically in the range of −90 dBm. It is thus critical to utilize an antenna with its gain as high as practicable while keeping the size of the antenna relatively small for physical as well as economic considerations.

It is therefore an object of the present invention to provide an antenna which is useful for receiving focused electromagnetic energy from a point in its near field which is inexpensive, small and easy to manufacture.

Phased array antennas are used in the art in order to maximize gain when required by coherently adding signals incident on each constituent element of the array. Moreover, linear phased array antennas are well known in the art and are useful in forming a beam in the far field of the antenna and electronically scanning the beam by varying the phase shift across the array in a linear fashion. For example, U.S. Pat. No. 3,999,182 teaches such an antenna useful in aircraft landing systems operating in the microwave frequency range.

Linearly phase shifted array antennas are not useful, however, in operating in the near field, and in particular, are not useful in obtaining a fixed beam focused signal with relatively high gain for signals of relatively low power, because as array aperture increases in size (which increases antenna gain), the distance at which the array is focused is much farther away. This limits the effectiveness of high gain antennas at shorter distances.

SUMMARY OF THE INVENTION

In one major aspect of the invention, a fixed beam array antenna focused at a focal point located in its near field region comprises a plurality of conductive patch elements for transducing electromagnetic energy with corresponding electric signals, the patch elements being juxtaposed such that at least one is located closer to the focal point than at least one other of the elements. The antenna also comprises signal adding means for coherently adding together the signals obtained from each of the patch elements; and phase shifting means coupled between the patch elements and the signal adding means for shifting, prior to being added, the phase of the signal obtained from each patch element located relatively closer to the focal point relative to the phase of the signal obtained from each patch element located relatively further away from the focal point such that the signals are coherently added together substantially in phase by the signal adding means.

In particular, the invention contemplates a non-linear fixed beam array antenna for receiving an electromagnetic beam emanating from a source centrally located in its near field region comprising four conductive patch elements comprising two inner patch elements and two outer patch elements juxtaposed linearly on a substantially flat substrate, wherein each of the patch elements is arranged to transduce electromagnetic energy with corresponding electric signals. The antenna also comprises means for shifting the phase of the signals obtained from each of the two inner patch elements by an amount substantially equivalent to the difference between the time the electromagnetic beam is incident upon each inner element and the time the electromagnetic beam is incident upon each outer element; and signal adding means for coherently adding the phase-shifted signals from each inner element and the non-phase-shifted signals from each outer element.

In another major aspect of the invention, a communication system for transferring data through the air over a relatively short fixed distance comprises a transmitting antenna comprising a leaky coaxial cable for radiating electromagnetic energy modulated with data to be transferred; and a non-linear fixed beam array antenna for receiving the modulated electromagnetic energy from the leaky coaxial cable. The fixed beam array antenna is juxtaposed with the transmitting antenna such that said transmitting antenna extends at least partially through the near-field region of the fixed beam array antenna. The fixed beam array antenna comprises four conductive patch elements comprising two inner patch elements and two outer patch elements juxtaposed linearly on a substantially flat substrate, wherein each of the patch elements is arranged to transduce electromagnetic energy with corresponding electric signals. The antenna also comprises means for shifting the phase of the signals obtained from each of the two inner patch elements by an amount substantially equivalent to the difference between the time the electromagnetic beam is incident upon each inner element and the time the electromagnetic beam is incident upon each outer element; and signal adding means for coherently adding the phase-shifted signals from each inner element and the non-phase-shifted signals from each outer element.

DETAILED DESCRIPTION OF THE PREFERRED EMBODIMENT

Figure 1:
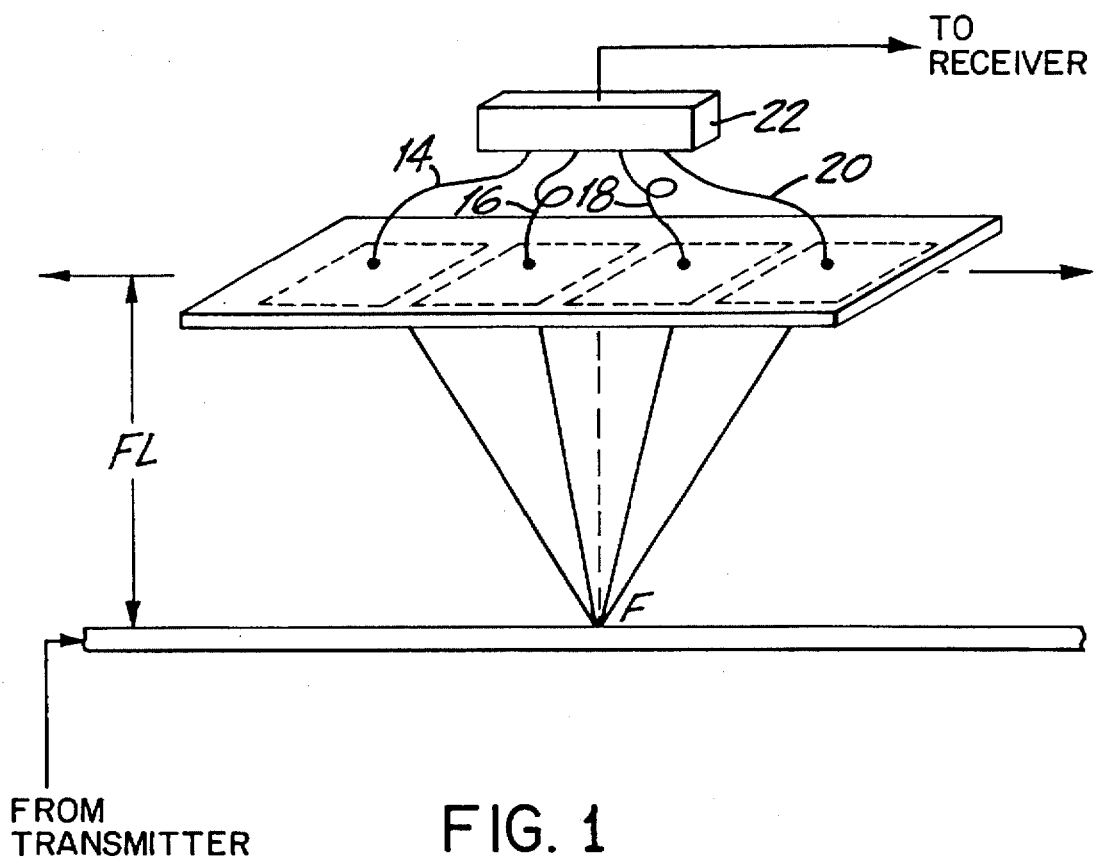
FIG. 1 is a diagram of a preferred embodiment communications system in accordance with the present invention.

FIG. 1 illustrates a preferred embodiment of a communication system utilizing the non-linear phase shift principles of the present invention. The system 1 comprises a transmitting antenna in the form of a leaky coaxial cable 4, which is linearly disposed along the length of a train track (not shown). The leaky coaxial cable 4 is connected to a transmitter (not shown) and serves to radiate electromagnetic signals in the form of a modulated microwave carrier in a fashion well known in the art.

A non-linear fixed beam array antenna 10 is coupled to a receiver (not shown) and is located on the underside of a train car (not shown) such that it may be laterally displaced in parallel with the cable 4 as indicated by the left and right arrows in FIG. 1. The distance from the antenna 10 the to cable 4 is the focal length FL of the system 1, which is a known quantity (approximately 9" in the preferred embodiment) and which is used to determine the design parameters of the antenna as will be described in detail below. Importantly, the distance from the antenna 10 to the cable 4 is the same (and is equal to FL) regardless of the lateral movement of the antenna 10 with respect to the cable 4. Thus, the antenna 10 will always be a distance FL from the cable 4 and will resultingly be always focused on the transmitting cable 4 throughout operation of the system; i.e., as the locomotive car on which the antenna 10 is mounted traverses the train track along which the cable 4 is located.

Figure 2:
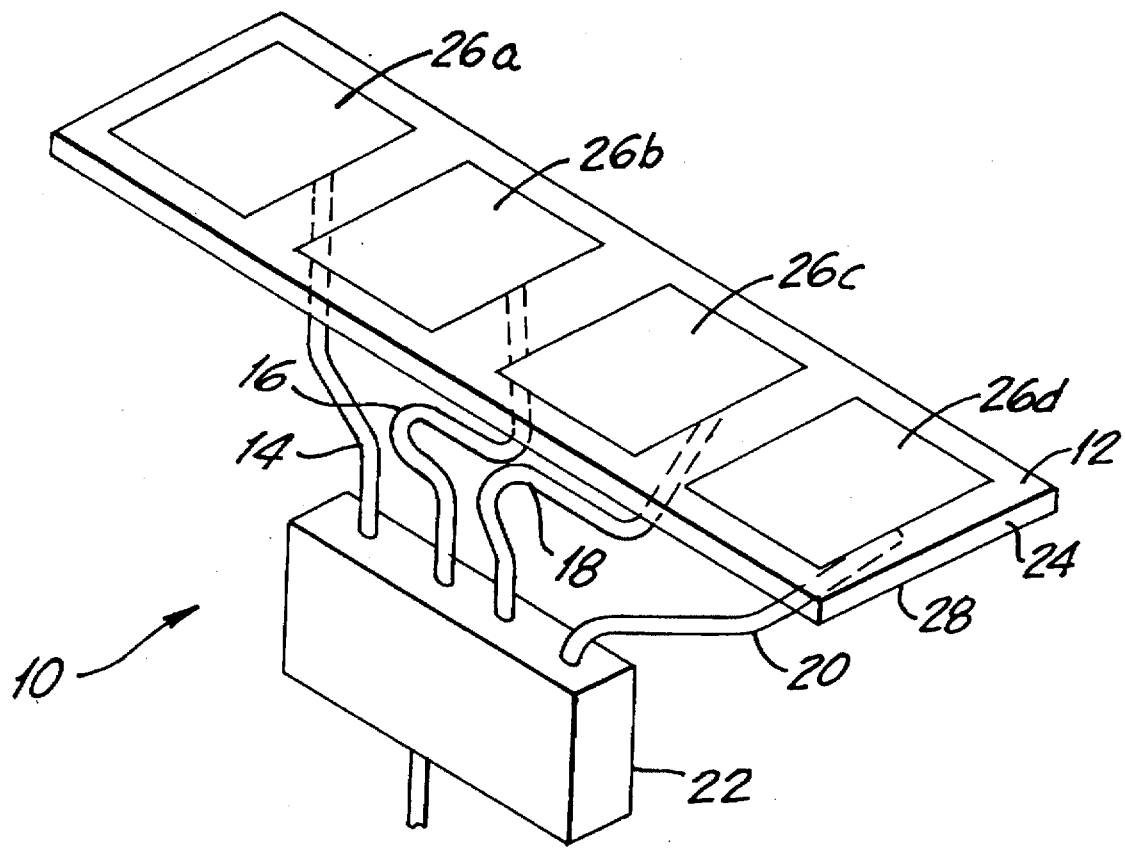
FIG. 2 is a perspective view of a preferred embodiment antenna of the present invention.

FIG. 2 illustrates the non-linear fixed beam array antenna 10 in accordance with the teachings of the present invention. The antenna 10 comprises a patch array grid 12 connected by four coaxial feed lines 14, 16, 18 and 20 to a four way power divider 22.

The patch array grid 12 is comprised of a dielectric substrate 24, which is typically made from ROGERS DUROID or a comparable substrate material. Four copper microstrip patch elements 26a, 26b, 26c, and 26d are located on the substrate 24 in a linear fashion as shown and are evenly spaced apart by an integral number of wavelengths of the particular frequency being used. In the preferred embodiment, the antenna is designed to operate at approximately 2.4 GHz, so the inter-element spacing is 3.827". The patches are fabricated from copper in a method well known in the art for fabricating microstrip patches for array antennas. A ground plane 28 is located on the side of the substrate 24 opposite the patches 26.

The coaxial feedlines 14 and 20, which are coupled to the outer two patch elements 26a and 26d, respectively, are of equal length. Thus, an electromagnetic signal emanating from a point centrally located below the antenna 10 (i.e., F) will arrive at substantially the same time and in phase at each outer patch element 26a and 26d. Each signal is coherently added together in order to increase the gain of the received signal without causing destructive interference therebetween.

The coaxial feed lines 16 and 18, which are coupled to the two inner patch elements 26b and 26c, respectively, function as delay lines with respect to the coaxial feed lines 14 and 20. The delay of coaxial feed lines 16 and 18 is calculated to be equivalent to the delay in time from the electromagnetic wave arriving at the inner elements and when it arrives at the outer elements. By delaying the phase by this amount, the inner two elements can be coherently added along with the outer two elements and thus increase the effective gain of the system dramatically.

Figure 3:
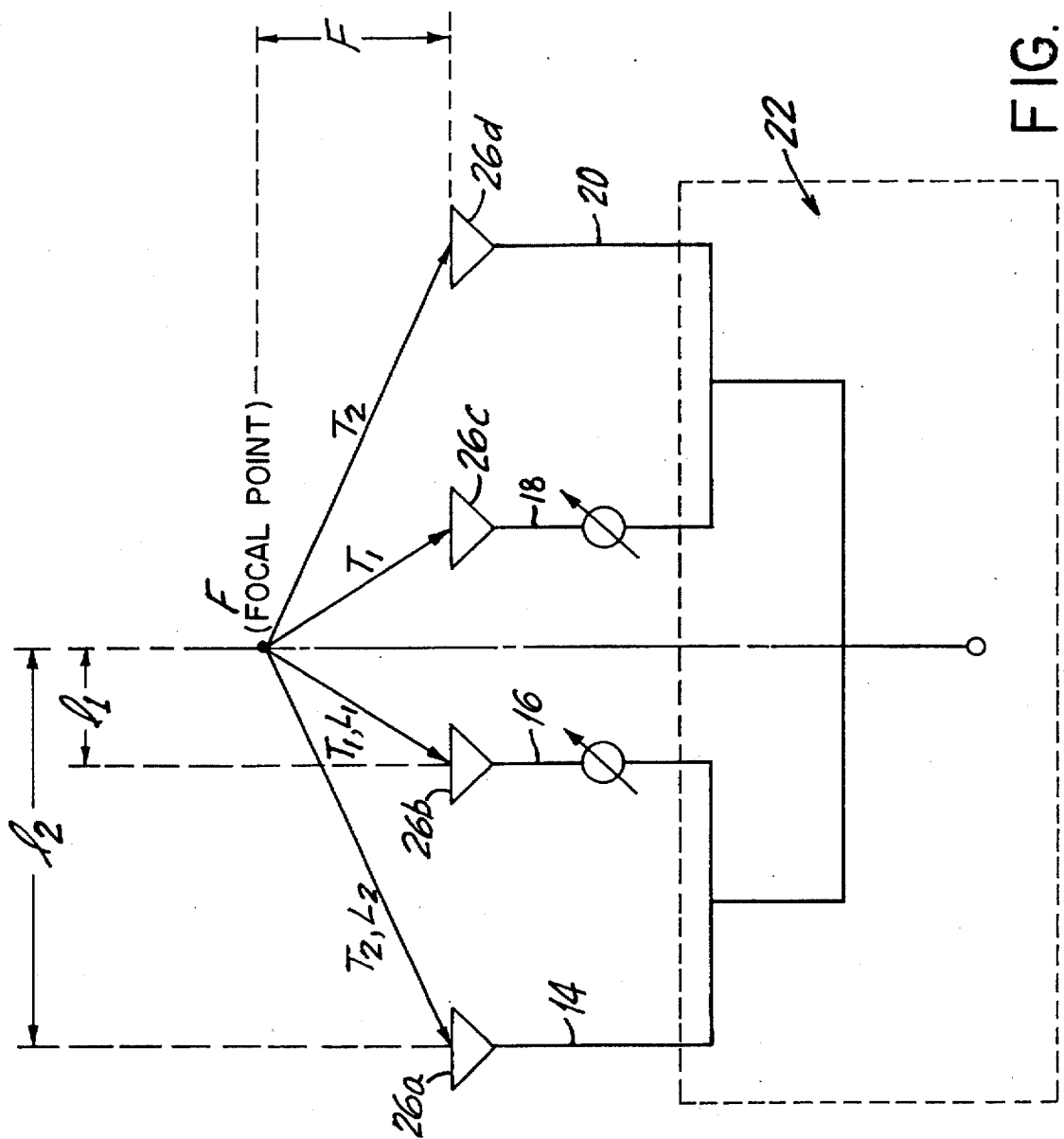
FIG. 3 is a diagram illustrating the principles of the present invention.

FIG. 3 illustrates this principle of operation. T1 is the time required for an electromagnetic wave to travel from the focal point F to each of the two inner patch elements. T2 is the time required for the electromagnetic wave to travel from the focal point F to each of the two outer patch elements. By delaying the phase of the signal traveling through the two inner elements by the amount T2-T1, the signals representative of the incident waves arrive at the corporate feed network substantially in phase and the gain of the system is substantially increased.

The location along the center line CL of the focal point F is thus a function of the phase shift implemented by the phase shifters on each of the two inner patch elements in accordance with the following formulation:

$$\Delta L = L_2 - L_1$$
$$= \sqrt{F^2 + l_1^2} - \sqrt{F^2 + l_2^2}$$

where L is the distance from the center line to the patch center. Moreover, the phase delay is provided as follows:

Phase delay=$360° \Delta L / \lambda_o$ where $\lambda_o$=free space wavelength.

The cable length is provided as $$\text{Cable length} = \frac{(\text{Phase delay}) \lambda_d}{360°}$$

where $\lambda d$=wavelength in the cable.

As the phase shift in each of the two inner elements is diminished, the focal point F is extended further from the antenna, and as the phase shift in each of the two inner elements is increased, the focal point F is retracted closer to the antenna. Thus, in any given system application, the phase shift is readily calculated once the location of the focal point F, and the position of each patch element is known.

The dimensions of the patch elements are determined as a function of the frequency operation of the antenna as follows:

$$\text{Patch length } L = .49 \lambda_o / \sqrt{\epsilon_r}$$

where $\lambda_o$=free space wavelength at the center frequency.

$\lambda_o$=(11.803 in.)/2.467GHz

The patch width w≡$60\lambda_o$/Rin$_1$ where Rin is the input impedance to the patch (50Ω).

The interelement spacings of the patch elements are also determined as a function of the frequency operation of the antenna as follows. A separation of $0.8\lambda_o$ was determined experimentally for the maximum directivity with minimal pattern degradation. It is noted that the separation is less than the full λ due to the properties of the dielectric.

The number of patch elements may vary in accordance with a particular application. In the preferred embodiment, the number of patch elements used was selected to be four since this number gave the required gain and yet yielded a physical profile small enough to be located in the desired platform. Thus, the number of elements selected for a given application will be a function of the gain required as well as the physical constraints of the system.

Other configurations of patch elements may be used within the spirit and scope of the present invention in addition to the preferred linearly arranged embodiment. In addition, shapes other than the flat substrate described herein may be used if required by the physical profile of the system. As long as the signal obtained from each patch element is delayed by the proper amount so that they may be coherently added without appreciable destructive interference.

The antenna of the present invention, while described with reference to a receive mode of operation, operates reciprocally and is capable of transmitting a waveform to the focal point F in accordance with known principles as applied to the arrangement of the instant invention. Thus, a signal input to the power divider is uniformly split amongst the four patch elements for radiation therefrom. The signals fed to the two inner patch elements are phase shifted as described above in order that a receive antenna located at the focal point will be able to coherently add all four waveforms together without an appreciable amount of destructive interference.

In such a transmitting system, the signal from the transmitter is evenly divided with uniform amplitude taper across each element in order to maximize the gain at a specific focal point F in the near field. Beam shaping can be accomplished by utilizing a non-linear amplitude taper to control sidelobe radiation. It is also possible to increase the depth of field by varying the phase taper across the patch elements in two orthogonal planes. In this manner, a planar array could be focused at point "A" in one plane, and point "B" in the orthogonal plane. Similarly, schemes may be devised to shape a focal region in these dimensions.

While various changes and modifications may be made in the detailed construction, it is understood that such changes or modifications will be within the spirit and scope of the present invention, as it is defined by the appended claims.

We claim:

1. A fixed beam array antenna focused at a focal point located in its near field region comprising:
   (a) a plurality of conductive patch elements arranged in a linear fashion for transducing electromagnetic energy with corresponding electric signals, said patch elements being juxtaposed such that at least one of said patch elements is located closer to the focal point than at least one other of said patch elements;
   (b) signal adding means comprising a four way power divider for coherently adding together the signals obtained from each of the patch elements; and
   (c) phase shifting means coupled between the plurality of patch elements and the signal adding means for shifting, prior to being added, the phase of the signal obtained from each patch element located relatively closer to the focal point relative to the phase of the signal obtained from each patch element located relatively further away from the focal point such that the signals are coherently added together substantially in phase by said signal adding means.

2. The antenna of claim 1 wherein said phase shifting means comprise coaxial feed lines, wherein a single coaxial feed line connects each of said plurality of patch elements to an input port of said signal adding means.

3. The antenna of claim 2 wherein the length of a coaxial feed line connecting a patch element which is located relatively closer to the focal point is longer than a coaxial feed line connecting a patch element which is located relatively further away from the focal point.

4. The antenna of claim 1 wherein said patch elements are comprised of copper microstrip patch elements.

5. A fixed beam array antenna focused at a focal point located in its near field region comprising:
   (a) a plurality of conductive patch elements for transducing electromagnetic energy with corresponding electric signals, said patch elements being juxtaposed in mirror symmetrical pairs about the focal point such that at least one of the mirror symmetrical pairs is located closer to the focal point than at least one other of the mirror symmetrical pairs;
   (b) signal adding means for coherently adding together the signals obtained from each of the patch elements; and
   (c) phase shifting means coupled between the plurality of patch elements and the signal adding means for shifting, prior to being added, the phase of the signal obtained from each patch element located relatively closer to the focal point relative to the phase of the signal obtained from each patch element located relatively further away from the focal point such that the signals are coherently added together substantially in phase by said signal adding means.

6. The antenna of claim 5 wherein said phase shifting means comprise coaxial feed lines, wherein a single coaxial feed line connects each of said plurality of patch elements to an input port of said signal adding means.

7. The antenna of claim 6 wherein the length of a coaxial feed line connecting a patch element which is located relatively closer to the focal point is longer than a coaxial feed line connecting a patch element which is located relatively further away from the focal point.

8. The antenna of claim 5 wherein said patch elements are comprised of copper microstrip patch elements.

9. A non-linear fixed beam array antenna for receiving an electromagnetic beam emanating from a source located at a focal point in its near field region comprising:
   (a) a plurality of conductive patch elements for transducing electromagnetic energy with corresponding electric signals, said patch elements being juxtaposed linearly along a substantially flat substrate such that at least one of said patch elements is located closer to the focal point than at least one other of said patch elements;
   (b) signal adding means comprising a four way power divider for coherently adding together the signals obtained from each of the patch elements; and
   (c) phase shifting means coupled between the plurality of patch elements and the signal adding means for shifting, prior to adding, the phase of the signal obtained from each patch element located relatively closer to the focal point relative to the phase of the signal obtained from each patch element located relatively further away from the focal point such that the signals are coherently added together substantially in phase by said signal adding means and the electromagnetic beam is focused on said array.

10. The antenna of claim 9 wherein said phase shifting means comprise coaxial feed lines, wherein a single coaxial feed line connects each of said plurality of patch elements to an input port of said signal adding means.

11. The antenna of claim 10 wherein the length of a coaxial feed line connecting a patch element which is located relatively closer to the focal point is longer than a coaxial feed line connecting a patch element which is located relatively further away from the focal point.

12. The antenna of claim 9 wherein said patch elements are comprised of copper microstrip patch elements.

13. A non-linear fixed beam array antenna for receiving an electromagnetic beam emanating from a source centrally located in its near field region comprising:
   (a) four conductive patch elements comprising two inner patch elements and two outer patch elements juxtaposed linearly on a substantially flat substrate, each of said patch elements being arranged to transduce electromagnetic energy with corresponding electric signals;
   (b) means for shifting the phase of the signals obtained from each of the two inner patch elements by an amount substantially equivalent to the difference between the time the electromagnetic beam is incident upon each inner element and the time the electromagnetic beam is incident upon each outer element; and (c) signal adding means comprising a four way power divider for coherently adding the phase-shifted signals from each inner element and the non-phase-shifted signals from each outer element.

14. The antenna of claim 13 wherein said phase shifting means comprise coaxial feed lines, wherein a single coaxial feed line connects each of said plurality of patch elements to an input port of said signal adding means.

15. The antenna of claim 14 wherein the length of a coaxial feed line connecting a patch element which is located relatively closer to the focal point is longer than a coaxial feed line connecting a patch element which is located relatively further away from the focal point.

16. The antenna of claim 13 wherein said patch elements are comprised of copper microstrip patch elements.

17. A communication system for transferring data through the air over a relatively short fixed distance comprising:

a) a transmitting antenna comprising a leaky coaxial cable for radiating electromagnetic energy modulated with data to be transferred; and b) a non-linear fixed beam array antenna for receiving the modulated electromagnetic energy from the leaky coaxial cable, the fixed beam array antenna juxtaposed with said transmitting antenna such that said transmitting antenna extends at least partially through the near-field region of said fixed beam array antenna, said fixed beam array antenna comprising:

i) four conductive patch elements comprising two inner patch elements and two outer patch elements juxtaposed linearly on a substantially flat substrate, each of said patch elements being arranged to transduce electromagnetic energy with corresponding electric signals;

ii) means for shifting the phase of the signals obtained from each of the two inner patch elements by an amount substantially equivalent to the difference between the time the electromagnetic beam is incident upon each inner element and the time the electromagnetic beam is incident upon each outer element; and iii) signal adding means comprising a four way power divider for coherently adding the phase-shifted signals from each inner element and the non-phase-shifted signals from each outer element.

18. The antenna of claim 17 wherein said phase shifting means comprise coaxial feed lines, wherein a single coaxial feed line connects each of said plurality of patch elements to an input port of said signal adding means.

19. The antenna of claim 18 wherein the length of a coaxial feed line connecting a patch element which is located relatively closer to the focal point is longer than a coaxial feed line connecting a patch element which is located relatively further away from the focal point.

20. The antenna of claim 17 wherein said patch elements are comprised of copper microstrip patch elements.

* * * * *

UNITED STATES PATENT AND TRADEMARK OFFICE
CERTIFICATE OF CORRECTION

PATENT NO. : 5,673,052

DATED : September 30, 1997

INVENTOR(S) : John M. Cosenza, Michael Kane

It is certified that error appears in the above-identified patent and that said Letters Patent is hereby corrected as shown below:

column 4, line 41 delete "Rin$_1$" and substitute --Rin,-- therefor.

Signed and Sealed this

Second Day of December, 1997

Attest:

BRUCE LEHMAN

*Attesting Officer*    Commissioner of Patents and Trademarks